United States Patent
Yoshida

(10) Patent No.: US 11,267,347 B2
(45) Date of Patent: Mar. 8, 2022

(54) POWER STORAGE DEVICE

(71) Applicant: HONDA MOTOR CO., LTD., Tokyo (JP)

(72) Inventor: Hideyuki Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 58 days.

(21) Appl. No.: 16/751,229

(22) Filed: Jan. 24, 2020

(65) Prior Publication Data
US 2020/0247246 A1     Aug. 6, 2020

(30) Foreign Application Priority Data
Feb. 5, 2019 (JP) .............................. JP2019-018756

(51) Int. Cl.
| | |
|---|---|
| *B60L 50/00* | (2019.01) |
| *B60L 50/60* | (2019.01) |
| *H01M 50/20* | (2021.01) |
| *H01M 50/147* | (2021.01) |
| *H01M 50/502* | (2021.01) |
| *H01M 50/543* | (2021.01) |

(52) U.S. Cl.
CPC .......... *B60L 50/66* (2019.02); *H01M 50/147* (2021.01); *H01M 50/20* (2021.01); *H01M 50/502* (2021.01); *H01M 50/543* (2021.01); *H01M 2220/20* (2013.01)

(58) Field of Classification Search
CPC .. H01M 50/20; H01M 50/543; H01M 50/147; H01M 2/00; B60L 50/66

USPC ................................................... 429/99, 151
See application file for complete search history.

(56) References Cited

U.S. PATENT DOCUMENTS

| | | | | |
|---|---|---|---|---|
| 1,900,018 | A | * | 3/1933 | Lilienfeld ......... H01L 29/78681 330/309 |
| 4,405,697 | A | * | 9/1983 | Rowlette .......... H01M 10/0463 429/161 |
| 4,646,430 | A | * | 3/1987 | Clarke .................. H01M 50/54 29/623.1 |
| 4,683,180 | A | * | 7/1987 | Bish ...................... H01M 10/12 429/130 |

(Continued)

FOREIGN PATENT DOCUMENTS

JP     2013-129391     7/2013

*Primary Examiner* — Hau V Phan
(74) *Attorney, Agent, or Firm* — Amin, Turocy & Watson, LLP

(57) ABSTRACT

A power storage device includes a plurality of power storage units which are stacked and disposed in a predetermined direction, a plurality of terminal portions which are provided in the plurality of power storage units, and a plurality of conductive members which extend in the predetermined direction along the plurality of power storage units and are connected to the plurality of terminal portions. Each of the plurality of conductive members includes a connection portion attached to the terminal portion, a main body portion provided integrally with the connection portion, and an electrically insulating coating covering a surface of the main body portion. In each of the plurality of conductive members, a length of the connection portion in the predetermined direction is formed to change with a trend of increasing as a length of the main body portion in the predetermined direction increases.

7 Claims, 8 Drawing Sheets

(56) References Cited

U.S. PATENT DOCUMENTS

| | | | | |
|---|---|---|---|---|
| 6,358,641 | B1* | 3/2002 | Mease | H01M 8/0247 |
| | | | | 429/470 |
| 8,586,226 | B2* | 11/2013 | Hashida | H01M 50/209 |
| | | | | 429/99 |
| 9,112,227 | B2* | 8/2015 | Tonozuka | H01M 10/6553 |
| 9,666,378 | B2* | 5/2017 | Hayashida | H01G 2/14 |
| 9,748,540 | B2* | 8/2017 | Ikeda | H01M 50/502 |
| 10,014,507 | B2* | 7/2018 | Tsuruta | H01G 2/04 |
| 2005/0123828 | A1* | 6/2005 | Oogami | B60L 50/64 |
| | | | | 429/152 |
| 2008/0160395 | A1* | 7/2008 | Okada | B60L 50/64 |
| | | | | 429/99 |
| 2010/0167115 | A1* | 7/2010 | Okada | H01M 50/24 |
| | | | | 429/99 |
| 2012/0328920 | A1* | 12/2012 | Takase | H01M 50/20 |
| | | | | 429/90 |
| 2013/0034764 | A1* | 2/2013 | Ochi | H01M 50/116 |
| | | | | 429/99 |
| 2015/0155533 | A1* | 6/2015 | Kim | H01M 50/209 |
| | | | | 429/99 |
| 2015/0380713 | A1* | 12/2015 | Kimura | H01G 11/10 |
| | | | | 429/121 |
| 2016/0233465 | A1* | 8/2016 | Lee | H01M 10/625 |
| 2016/0240288 | A1* | 8/2016 | Chiku | H01C 1/04 |
| 2018/0138560 | A1* | 5/2018 | Bessho | H01M 10/6557 |
| 2019/0027719 | A1* | 1/2019 | Kim | H01M 50/258 |

* cited by examiner

POWER STORAGE DEVICE

CROSS-REFERENCE TO RELATED APPLICATION

Priority is claimed on Japanese Patent Application No. 2019-018756, filed Feb. 5, 2019, the content of which is incorporated herein by reference.

BACKGROUND OF THE INVENTION

Field of the Invention

The present invention relates to a power storage device.

Description of Related Art

Conventionally, a battery pack which includes a plurality of battery modules configured of a plurality of battery cells and a case for accommodating the plurality of battery modules that have been stacked therein is known (for example, see Japanese Unexamined Patent Application, First Publication No. 2013-129391).

SUMMARY OF THE INVENTION

In the battery pack according to the conventional technique mentioned above, it becomes necessary to electrically connect layers of the stacked battery modules. In the case of electrically connecting the layers of the plurality of battery modules with a conductive member such as a bus bar, it is desired to improve a work efficiency while preventing contact between live lines of different polarities.

An aspect according to the present invention has been made in view of the above circumstances, and it is an object thereof to provide a power storage device in which efficiency of electrical connection work can be improved.

In order to solve the above problems and achieve the object, the present invention adopts the following aspects.

(1) A power storage device according to one embodiment of the present invention includes a plurality of power storage units which are stacked and disposed in a predetermined direction, a plurality of terminal portions which are provided in the plurality of power storage units, and a plurality of conductive members which extend in the predetermined direction along the plurality of power storage units and are connected to the plurality of terminal portions. Each of the plurality of conductive members includes a connection portion attached to the terminal portion, a main body portion provided integrally with the connection portion, and an electrically insulating coating covering a surface of the main body portion. In each of the plurality of conductive members, a length of the connection portion in the predetermined direction is formed to change with a trend of increasing as a length of the main body portion in the predetermined direction increases.

(2) In the above aspect (1), each of the plurality of terminal portions may include an attachment portion to which the connection portion is attached, and a position of the attachment portion in a direction intersecting the predetermined direction may be formed to change to a position further outward from the power storage unit as the length of the main body portion in the predetermined direction in the conductive member connected to each terminal portion increases.

(3) In the above aspect (1) or (2), an outer shape of the connection portion may be formed in a shape which is bent from the main body portion toward the terminal portion in a direction intersecting the predetermined direction and extends in the predetermined direction.

(4) In any one of the above aspects (1) to (3), each of the plurality of terminal portions may include an attachment portion to which the connection portion is attached, and a protruding portion which protrudes from the attachment portion in a direction intersecting the predetermined direction, and a protruding height of the protruding portion in the intersecting direction may be formed to change with a trend of increasing as the protruding portion is separated from the connection portion in the predetermined direction.

(5) The power storage device according to any one of the above aspects (1) to (4) may further include a plurality of housings which accommodate the plurality of power storage units, and lid members which close opening portions formed to face the plurality of terminal portions in each of the plurality of housings.

According to the above aspect (1), in the case of connecting the plurality of conductive members having different lengths disposed along the plurality of stacked power storage units to the terminal portions of the power storage units in different layers sequentially, by connecting the conductive members in the order from a relatively shorter conductive member to a longer conductive member to the terminal portions in the respective layers, it is possible to dispose the plurality of conductive members having different lengths to overlap each other. In this case, the length of the connection portion of the conductive member connected later is formed to be longer than the length of the connection portion of the conductive member connected earlier. Accordingly, by making the shape of the terminal portion of each layer different, it is possible to prevent the longer conductive member connected afterwards from coming into contact with the terminal portion to which the shorter conductive member has been connected first. Thus, efficiency of the electrical connection work between the plurality of conductive members and the plurality of terminal portions can be improved.

In the case of the above aspect (2), since positions of the attachment portions provided in the power storage units in a plurality of different layers become a plurality of different positions in the direction intersecting the predetermined direction, it is possible to securely prevent the conductive members having different lengths from coming into contact with each other. Thus, efficiency of the electrical connection work between the plurality of conductive members and the plurality of terminal portions can be further improved.

In the case of the above aspect (3), since the shapes of the connection portions having different lengths are bent and extend in the predetermined direction, it is possible to securely prevent the longer connection portions from coming into contact with the shorter connection portions.

In the case of the above aspect (4), since the conductive member that does not correspond to the length of the connection portion in each terminal portion can be guided away from the attachment portion in a direction in which the protruding portion protrudes, it is possible to more securely prevent the conductive members having different lengths from coming into contact with each other.

In the case of the above aspect (5), it is possible to secure spaces required for the connection work between the terminal portions and the conductive members due to the opening portions provided in the housing.

DETAILED DESCRIPTION OF THE INVENTION

Hereinafter, an embodiment of a power storage device of the present invention will be described with reference to the accompanying drawings.

The power storage device of the present invention is mounted on a vehicle 1, for example. The vehicle 1 is, for example, an electrically driven vehicle such as an electric vehicle, a hybrid vehicle, and a fuel cell vehicle. An electric vehicle is driven using a battery as a power source. A hybrid vehicle is driven using a battery and an internal combustion engine as power sources. A fuel cell vehicle is driven using a fuel cell as a drive source.

Figure 1:
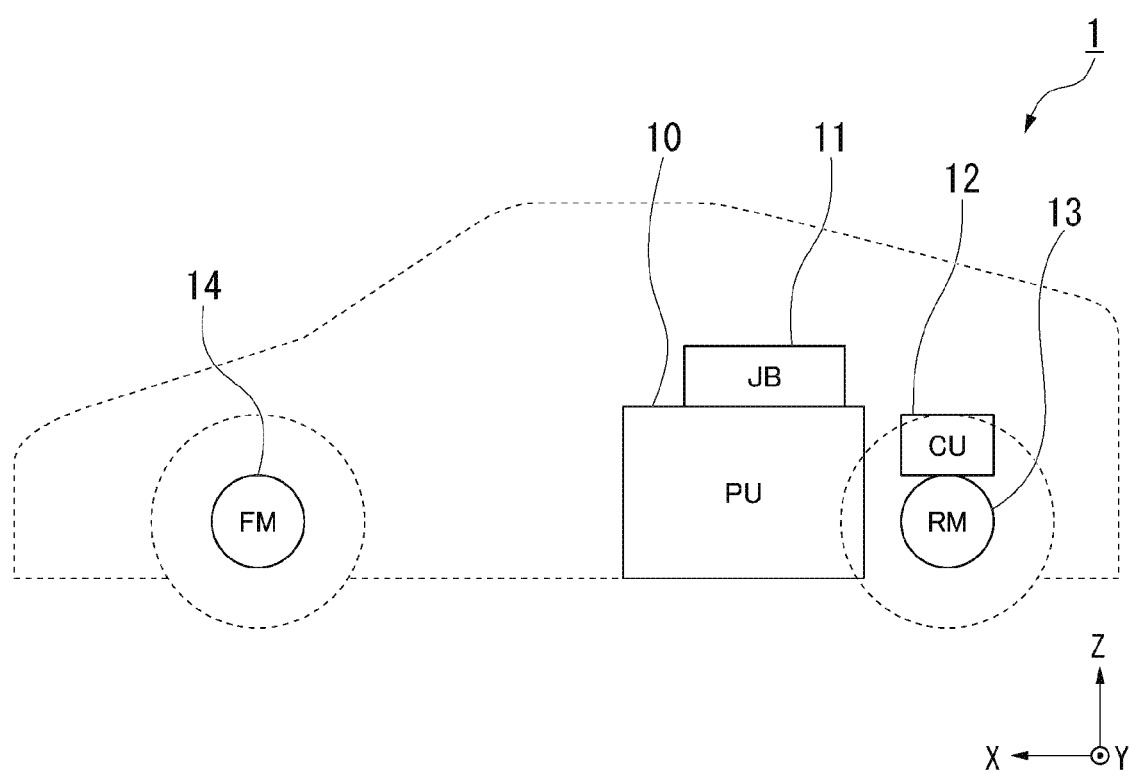
FIG. 1 is a diagram schematically showing a configuration of a portion of a vehicle on which a power storage device according to an embodiment of the present invention is mounted when viewed from a left side in a lateral direction of the vehicle.

FIG. 1 is a diagram schematically showing a configuration of a portion of the vehicle 1 on which a power storage device 10 according to an embodiment of the present invention is mounted, when viewed from a left side in a lateral direction of the vehicle.

As shown in FIG. 1, the vehicle 1 includes the power storage device (PU) 10, a junction box (JB) 11, a control unit (CU) 12, a rear motor (RM) 13, and a front motor (FM) 14.

Also, in the following description, each axial direction of an X-axis, a Y-axis, and a Z-axis orthogonal to each other in a three-dimensional space is a direction parallel to each axis. For example, a longitudinal direction of the vehicle 1 is parallel to the X-axis direction. A positive direction in the X-axis direction is a direction from a rear side toward a front side of the vehicle 1. A lateral direction of the vehicle 1 is parallel to the Y-axis direction. A positive direction in the Y-axis direction is a direction from a right side toward a left side of the vehicle 1. A vertical direction of the vehicle 1 is parallel to the Z-axis direction. A positive direction in the Z-axis direction is a direction from a lower side toward an upper side of the vehicle 1.

The junction box (JB) 11 is disposed, for example, on an upper portion of the power storage device 10. The junction box 11 includes electronic components such as relays and fuses for intensively supplying, interrupting, and distributing so-called high voltage.

The control unit (CU) 12 is integrally disposed on an upper portion of a housing of the rear motor (RM) 13, for example. The control unit 12 includes, for example, an inverter which performs mutual conversion between direct current (DC) power and alternating current (AC) power, a voltage converter which steps up or down a voltage between the power storage device 10 and the inverter, etc., a gate driver which controls the inverter and the voltage converter, a current sensor that measures a flowing current, etc.

The rear motor (RM) 13 and the front motor (FM) 14 are rotating electrical machines for driving the vehicle 1. Rotational shafts of the motors 13 and 14 are connected to rear wheels and front wheels of the vehicle 1. Each of the motors 13 and 14 generates a rotational driving force (powering operation) using electric power supplied from the power storage device 10. In addition, each of the motors 13 and 14 may generate electric power generated with the rotational driving force input into the rotational shaft. Each of the motors 13 and 14 may be configured to be able to transmit a rotational power of an internal combustion engine.

For example, each of the motors 13 and 14 is a three-phase AC brushless DC motor. Each of the motors 13 and 14 includes a rotor having permanent magnets for a magnetic field, and a stator which generates a rotating magnetic field for rotating the rotor. The motors 13 and 14 are rotationally driven by a three-phase alternating current output from the control unit 12.

The power storage device 10 is disposed behind a passenger seat of the vehicle 1. The power storage device 10 constitutes a power unit that is so-called a power source of the vehicle 1.

Figure 2:
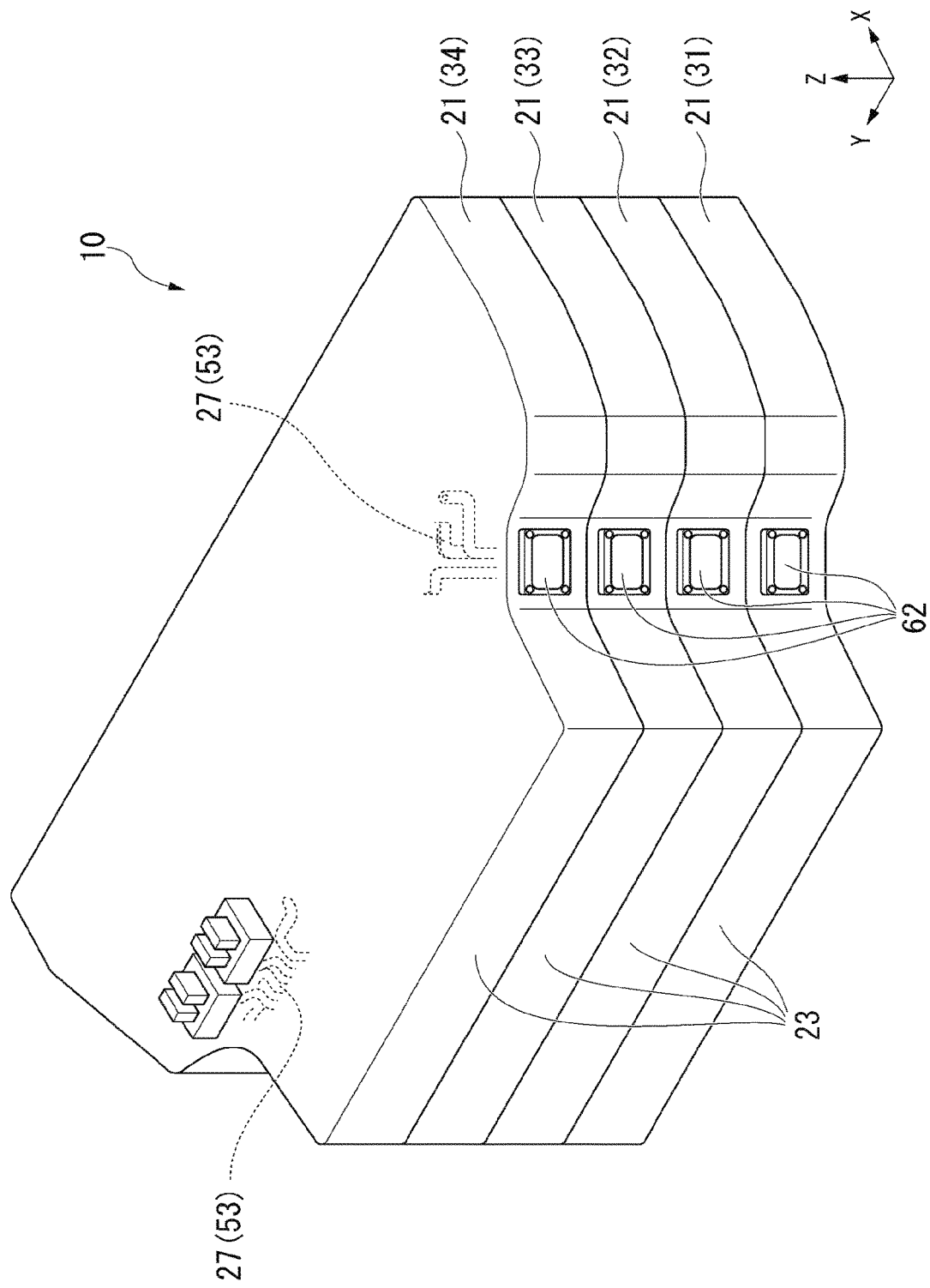
FIG. 2 is a perspective view showing a configuration of the power storage device according to the embodiment of the present invention.
Figure 3:
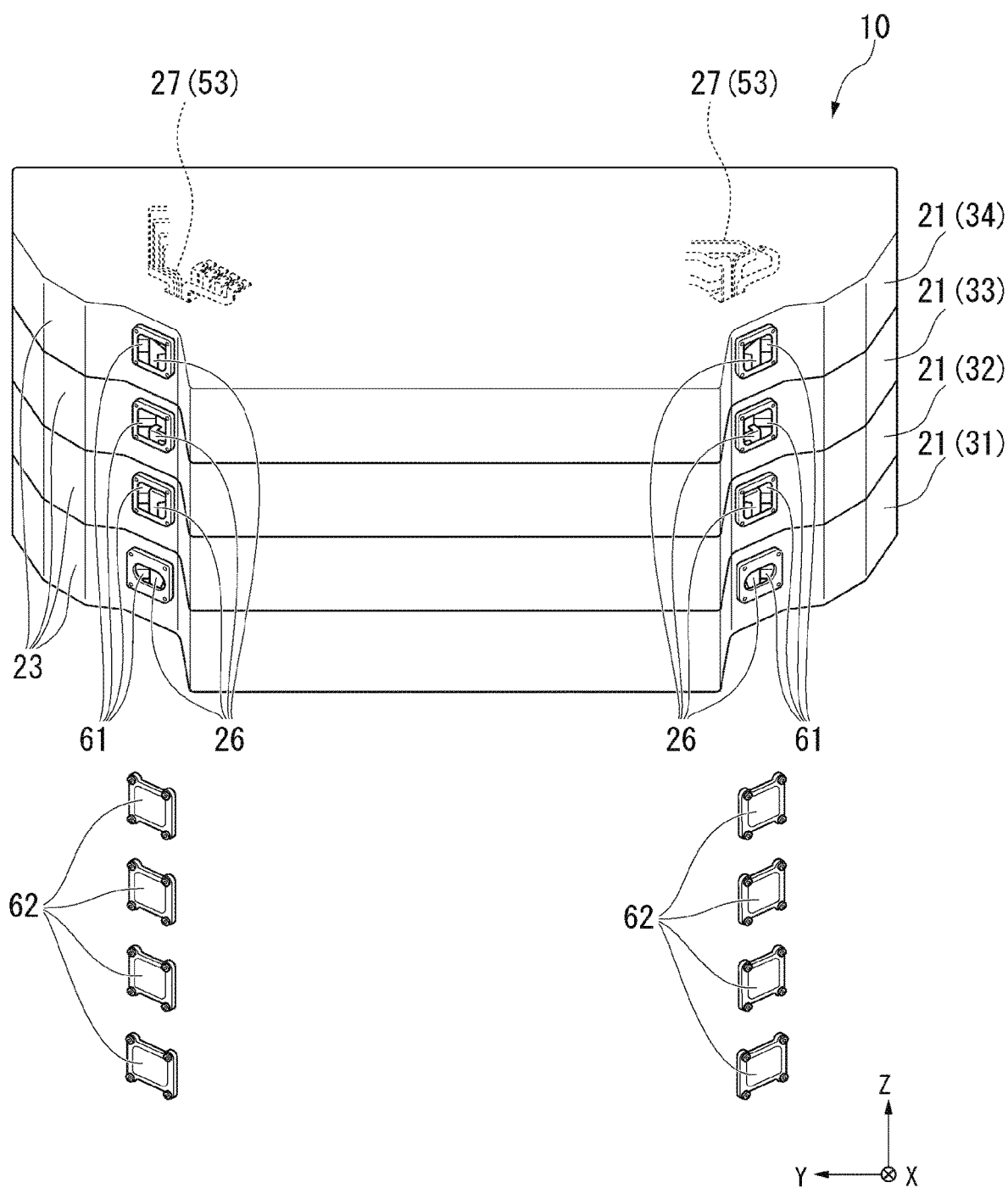
FIG. 3 is a perspective view showing a configuration of the power storage device according to the embodiment of the present invention.
Figure 4:
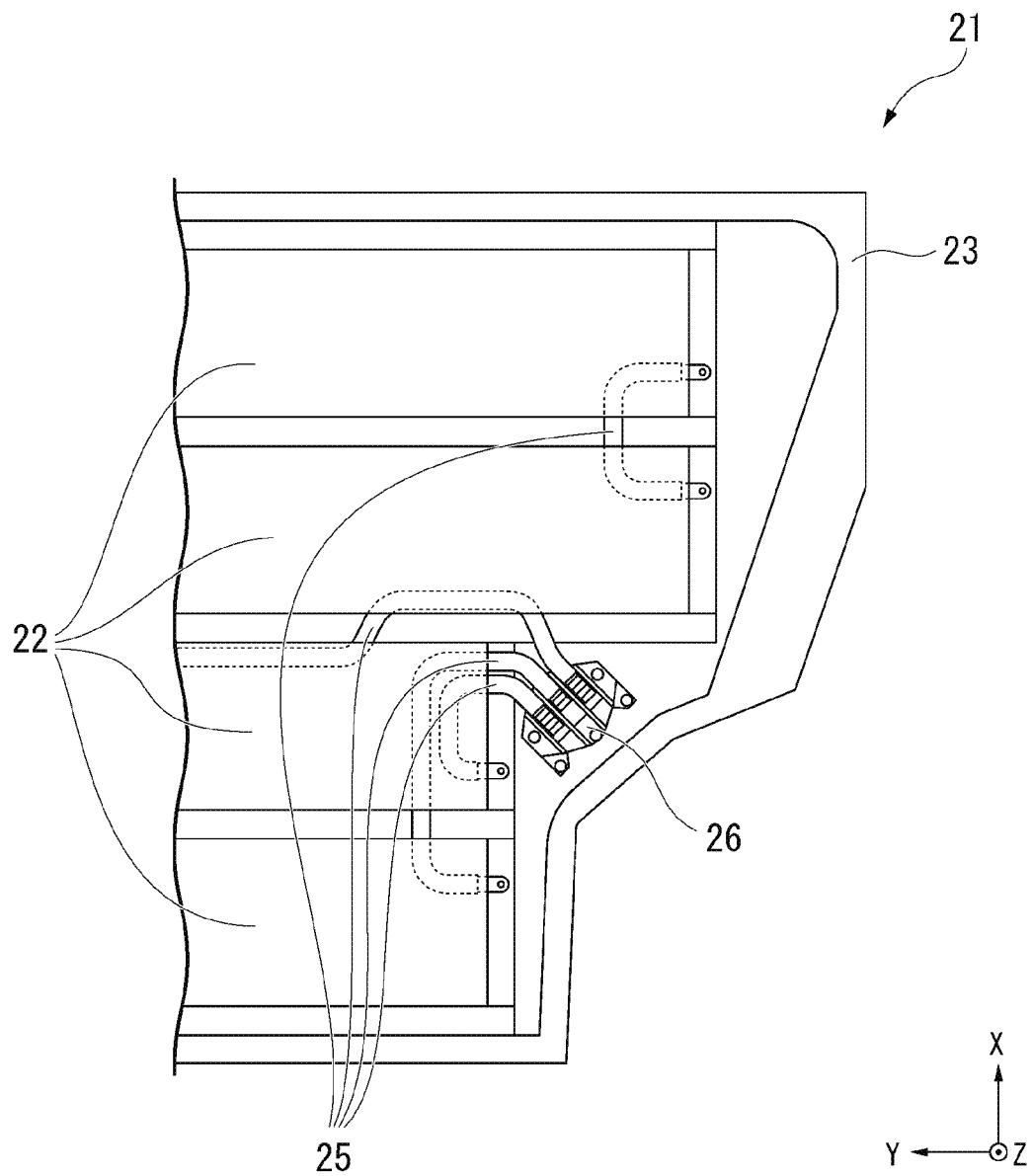
FIG. 4 is a plan view showing a configuration of a battery unit of the power storage device according to the embodiment of the present invention.
Figure 5:
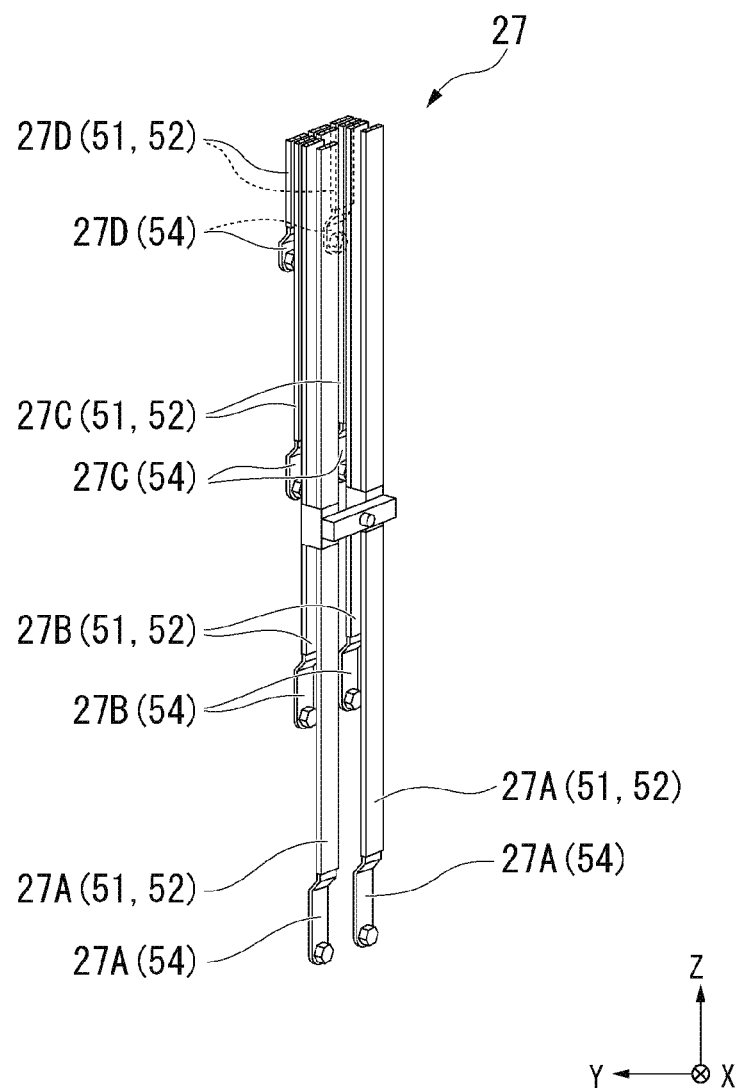
FIG. 5 is a perspective view showing a configuration of a conductive member in the power storage device according to the embodiment of the present invention.
Figure 6:
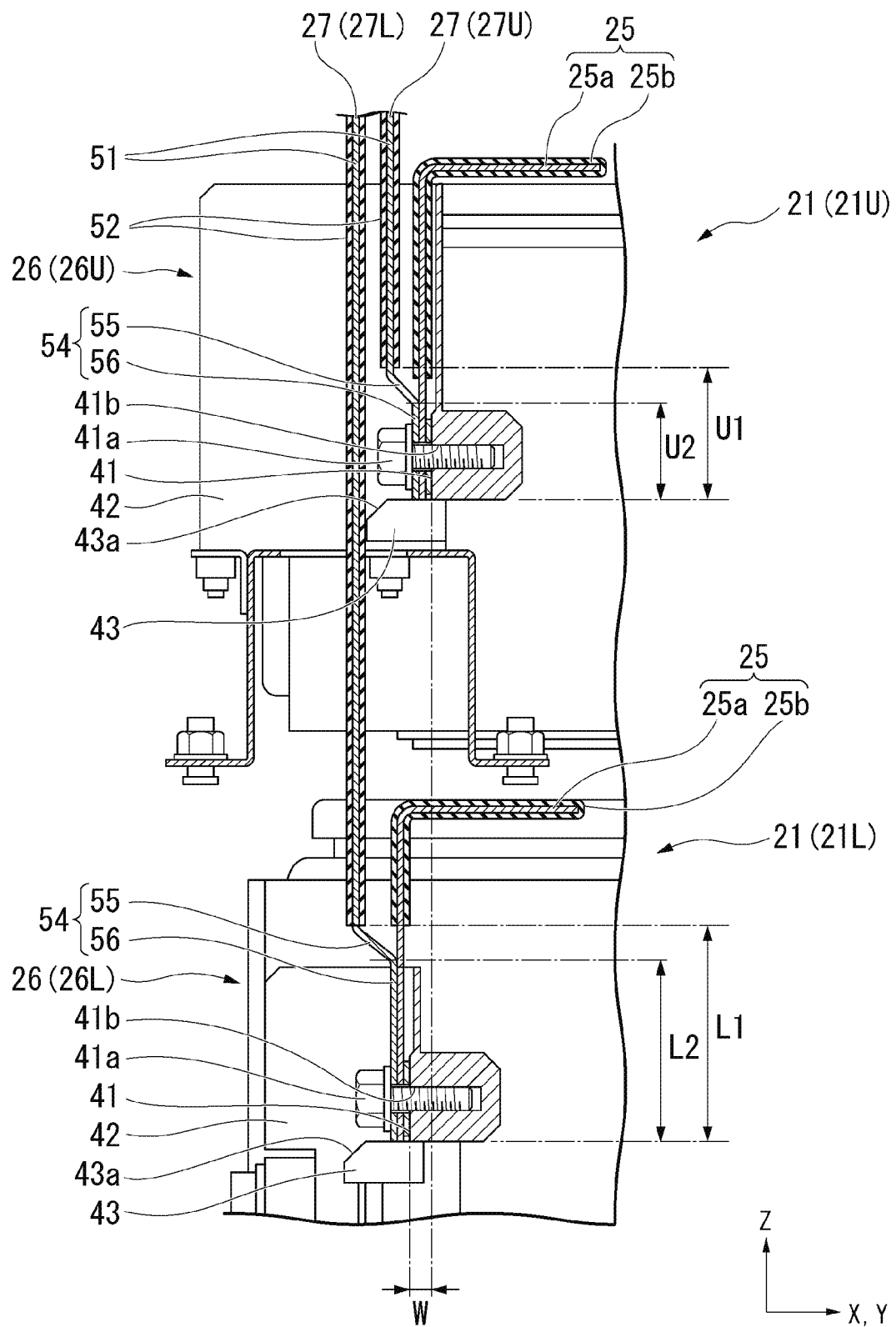
FIG. 6 is a cross-sectional view showing a terminal portion in the power storage device according to the embodiment of the present invention.
Figure 7:
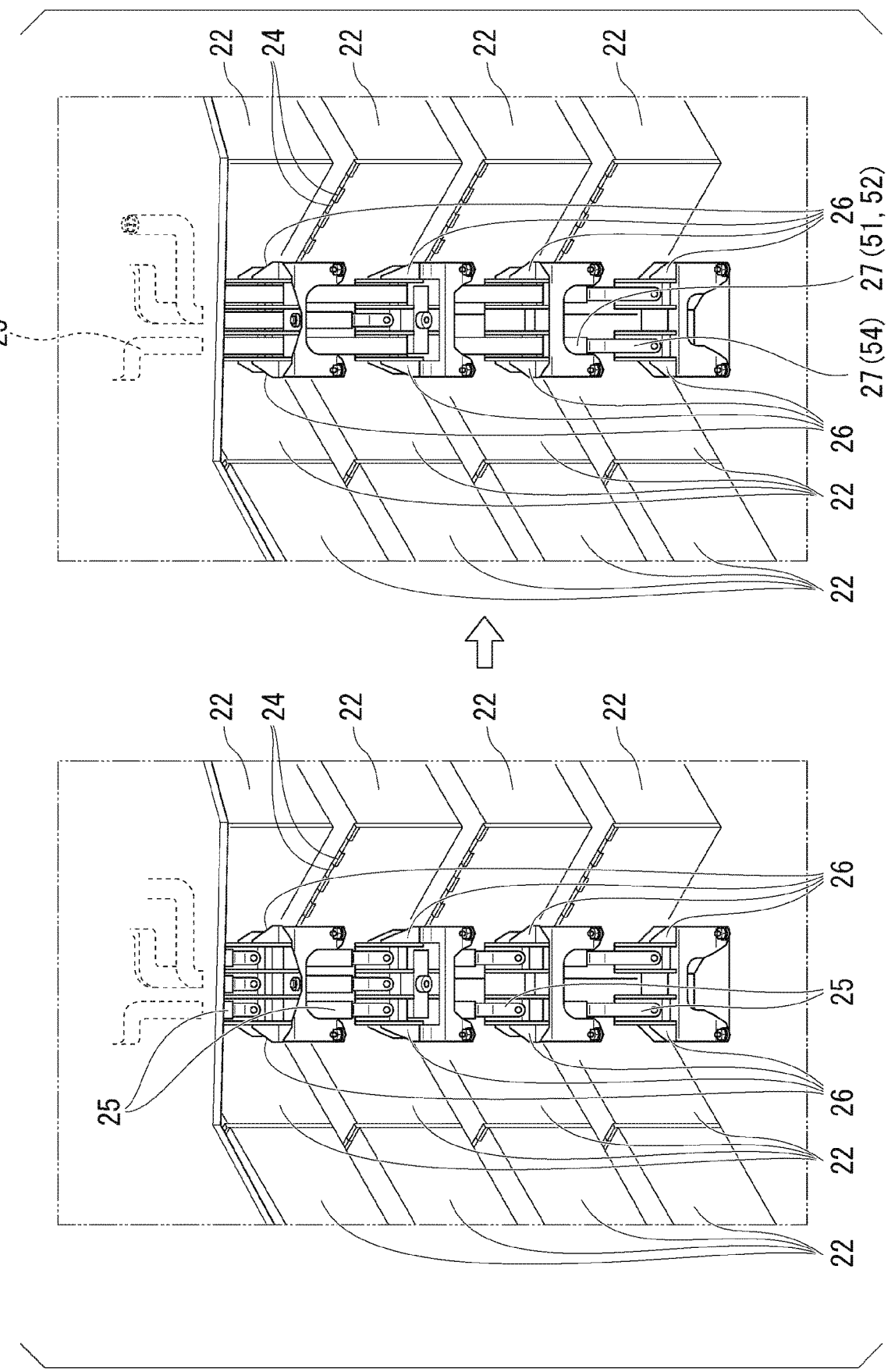
FIG. 7 is a perspective view showing before and after assembly of the conductive member in the power storage device according to the embodiment of the present invention.

FIGS. 2 and 3 are perspective views showing a configuration of the power storage device 10 according to the embodiment. FIG. 4 is a plan view showing a configuration of a battery unit 21 of the power storage device 10 according to the embodiment. FIG. 5 is a perspective view of a configuration of a conductive member 27 in the power storage device 10 according to the embodiment. FIG. 6 is a cross-sectional view of a terminal portion 26 in the power storage device 10 according to the embodiment. FIG. 7 is a perspective view showing before and after assembly of the conductive member 27 in the power storage device 10 according to the embodiment.

As shown in FIGS. 2, 3, 4 and 7, the power storage device 10 includes a plurality of battery units 21 stacked in the Z-axis direction. Each battery unit 21 includes a plurality of battery modules 22 and a unit case 23 which accommodates the plurality of battery modules 22.

Each battery module 22 includes a plurality of battery cells 24 connected in series.

The plurality of battery units 21 are, for example, four battery units 21. The four battery units 21 stacked in the Z-axis direction include a first battery unit 31 that is a first layer, a second battery unit 32 that is a second layer, a third battery unit 33 that is a third layer, and a fourth battery unit 34 that is a fourth layer, which are sequentially disposed in the positive direction of the Z-axis direction.

Each battery unit 21 includes a plurality of power distribution members 25, two terminal portions 26, and a plurality of conductive members 27.

As shown in FIG. 6, each of the plurality of power distribution members 25 is a so-called bus bar. The plurality of power distribution members 25 are connected to the plurality of battery modules 22 and the two terminal portions 26.

The plurality of power distribution members 25 extending from the plurality of battery modules 22 are distributed and connected to the two terminal portions 26. Each power distribution member 25 includes an electrically insulating coating portion 25b which covers surfaces of a main body portion 25a. The main body portion 25a of each power distribution member 25 is a portion excluding both end portions connected to the battery module 22 and the terminal portion 26.

As shown in FIGS. 2, 3 and 6, the two terminal portions 26 are disposed to be spaced apart from each other on both sides in the Y-axis direction at a peripheral portion of each battery unit 21.

Each terminal portion 26 is a so-called terminal block and includes a plurality of attachment seats 41, a plurality of wall portions 42, and protruding end portions 43.

As shown in FIGS. 6 and 7, the plurality of attachment seats 41 are, for example, two or three attachment seats 41. For example, each terminal portion 26 provided in each of the first battery unit 31 and the second battery unit 32 includes three attachment seats 41. Each terminal portion 26 provided in each of the third battery unit 33 and the fourth battery unit 34 includes two attachment seats 41.

The plurality of attachment seats 41 are arranged side by side in a predetermined direction within an X-Y plane, for example. A seat surface of each attachment seat 41 is formed parallel to the Z-axis direction. For example, a mounting hole 41b in which a fastening member 41a is mounted is formed in each attachment seat 41. An outer shape of the mounting hole 41b is formed, for example, in a shape that is recessed toward the inside of the battery unit 21 in a direction orthogonal to the Z-axis direction. The fastening member 41a advances and retreats in the direction orthogonal to the Z-axis direction along the mounting hole 41b. Among the plurality of power distribution members 25 and the plurality of conductive members, the fastening member 41a of each attachment seat 41 fastens and fixes the power distribution member 25 and the conductive member 27 in a predetermined combination to the attachment seat 41, thereby electrically connecting the power distribution member 25 and the conductive member 27 in the predetermined combination.

A position of each of attachment seats 41 in the direction orthogonal to the Z-axis direction is formed to change to a position further outward from the battery unit 21 as it is formed in the battery unit 21 positioned further toward the negative direction side (that is, a layer positioned further downward) in the Z-axis direction.

For example, as compared to the attachment seat 41 of each terminal portion 26 (26U) provided in the battery unit 21 (21U) on the positive direction side (that is, an upper layer) in the Z-axis direction, the attachment seat 41 of each terminal portion 26 (26L) provided in the battery unit 21 (21L) on the negative direction side (that is, a lower layer) in the Z-axis direction is disposed at a position further outward from the battery unit 21 by a predetermined distance W. That is, in the order of the fourth battery unit 34 of the fourth layer, the third battery unit 33 of the third layer, the second battery unit 32 of the second layer, and the first battery unit 31 of the first layer, which are sequentially disposed in the negative direction of the Z-axis direction, the position of the attachment seat 41 of each terminal portion 26 in the direction orthogonal to the Z-axis direction is formed to change to a position further outward from each battery unit 21 as lengths of the plurality of conductive members 27 in the Z-axis direction connected to each terminal portion 26 increase.

The plurality of wall portions 42 are disposed between the attachment seats 41 adjacent to each other in the plurality of attachment seats 41 arranged side by side in the predetermined direction. Each wall portion 42 protrudes outward from the battery unit 21 in the direction orthogonal to the Z-axis direction.

The protruding end portion 43 protrudes outward from the battery unit 21 in the direction orthogonal to the Z-axis direction from each end portion of the plurality of attachment seats 28 on the negative direction side in the Z-axis direction. A chamfered portion 43a chamfered in a tapered shape is formed at an edge portion on the positive direction side in the Z-axis direction at a tip portion of the protruding end portion 43. A protruding height of the chamfered portion 43a in the direction orthogonal to the Z-axis direction is formed to change with a trend of increasing toward the negative direction side in the Z-axis direction. That is, the protruding height of the chamfered portion 43a in the direction orthogonal to the Z-axis direction is formed to change with a trend of increasing when becoming further separated from a second connection portion 54, which will be described later, of the conductive member 27 attached to the attachment seat 28 toward the negative direction side in the Z-axis direction.

The protruding end portion 43 protrudes from the battery unit 21 in the direction orthogonal to the Z-axis direction at least further outwardly than the fastening member 41a of the attachment seat 41 and the plurality of conductive members 27 fixed to the attachment seat 41.

As shown in FIGS. 5, 6 and 7, the plurality of conductive members 27 are so-called bus bars.

The plurality of conductive members 27 are connected to predetermined electronic components in the junction box 11 and two terminal portions 26. The plurality of conductive members 27 are distributed and connected to the two terminal portions 26. For example, two conductive members 27 (a first conductive member 27A) are connected to each of two terminal portions 26 provided in the first battery unit 31. Two conductive members 27 (a second conductive member 27B) are connected to each of two terminal portions 26 provided in the second battery unit 32. Three conductive members 27 (a third conductive member 27C) are connected to each of two terminal portions 26 provided in the third battery unit 33. Three conductive members 27 (a fourth conductive member 27D) are connected to each of two terminal portions 26 provided in the fourth battery unit 34.

The four first conductive members 27A connected to the two terminal portions 26 of the first battery unit 31 and the four second conductive members 27B connected to the two terminal portions 26 of the second battery unit 32 are arranged side by side so as to overlap in the direction orthogonal to the Z-axis direction.

The six third conductive members 27C connected to the two terminal portions 26 of the third battery unit 33 and the six fourth conductive members 27D connected to the two terminal portions 26 of the fourth battery unit 34 are arranged side by side so as to overlap in the direction orthogonal to the Z-axis direction.

The two third conductive members 27C disposed on both sides in the predetermined direction among the three third conductive members 27C connected to each terminal portion 26, the two fourth conductive members 27D disposed on both sides in the predetermined direction among the three fourth conductive members 27D connected to each terminal portion 26, and the two first conductive members 27A and the two second conductive members 27B are arranged side by side so as to overlap in the direction orthogonal to the Z-axis direction.

Each conductive member 27 includes, for example, a main body portion 51, a cover portion 52, a first connection portion 53, and a second connection portion 54.

An outer shape of the main body portion 51 is formed in a plate shape extending in the Z-axis direction between the junction box 11 and the terminal portion 26. The length of the main body portion 51 in the Z-axis direction is formed to become longer as it is formed in the battery unit 21 further toward the negative direction side (that is, a layer positioned further downward) in the Z-axis direction. For example, as compared to the conductive member 27 (27U) provided in the battery unit 21 (21U) on the positive direction side (that is, an upper layer) in the Z-axis direction, the length of the main body portion 51 in the Z-axis direction in the conductive member 27 (27L) provided in the battery unit 21 (21L) on the negative direction side (that is, a lower layer) in the Z-axis direction is formed to be longer. That is, the length of the main body portion 51 in the Z-axis direction is formed to change with a trend of increasing in the order of the fourth conductive member 27D, the third conductive member 27C, the second conductive member 27B, and the first conductive member 27A, correspondingly to the fourth battery unit 34 of the fourth layer, the third battery unit 33 of the third layer, the second battery unit 32 of the second layer, and the first battery unit 31 of the first layer, which are sequentially disposed in the negative direction of the Z-axis direction.

The first connection portion 53 and the second connection portion 54 are provided integrally with the main body portion 51 at both ends of the conductive member 27 in the Z-axis direction. The first connection portion 53 is connected to a predetermined electronic component in the junction box 11. An outer shape of the first connection portion 53 is formed in a shape corresponding to a position or the like of the electronic component to be connected in the junction box 11.

The second connection portion 54 is connected to the terminal portion 26. The second connection portion 54 includes a bent portion 55 bent from the main body portion 51 toward the terminal portion 26 in the direction orthogonal to the Z-axis direction, and a flat portion 56 extending from the bent portion 55 parallel to the main body portion 51 toward the negative direction side in the Z-axis direction. The flat portion 56 is disposed on the attachment seat 41 such that a tip thereof on the negative direction side in the Z-axis direction abuts the protruding end portion 43 of the terminal portion 26. The flat portion 56 is fastened and fixed to the attachment seat 41 together with an end portion of the power distribution member 25.

The length of the second connection portion 54 in the Z-axis direction is formed to become longer as it is formed in the battery unit 21 further toward the negative direction side (that is, a layer positioned further downward) in the Z-axis direction. For example, as compared to the conductive member 27 provided in the battery unit 21 (21U) on the positive direction side (that is, the upper layer) in the Z-axis direction, the length of the second connecting portion 54 in the Z-axis direction in the conductive member 27 provided in the battery unit 21 (21L) on the negative direction side (that is, the lower layer) in the Z-axis direction is formed to be longer. That is, the length of the second connection portion 54 in the Z-axis direction is formed to change with a trend of increasing as the length of the main body portion 51 in the Z-axis direction increases in the order of the fourth conductive member 27D, the third conductive member 27C, the second conductive member 27B, and the first conductive member 27A, correspondingly to the fourth battery unit 34 of the fourth layer, the third battery unit 33 of the third layer, the second battery unit 32 of the second layer, and the first battery unit 31 of the first layer, which are sequentially disposed in the negative direction of the Z-axis direction.

As shown in FIG. 6, a length L1 of the second connection portion 54 in the Z-axis direction in the conductive member 27 (27L) provided in the battery unit 21 (21L) on the negative direction side in the Z-axis direction and a length L2 of the flat portion 56 in the second connection portion 54 in the Z-axis direction are formed to be longer than a length U1 of the second connection portion 54 in the Z-axis direction in the conductive member 27 (27U) provided in the battery unit 21 (21U) on the relatively positive direction side and a length U2 of the flat portion 56 in the second connection portion 54 in the Z-axis direction.

That is, the length L2 of the flat portion 56 in the Z-axis direction in the second connection portion 54 of the conductive member 27 (27L) provided in the battery unit 21 (21L) on the negative direction side in the Z-axis direction is formed to be longer than the length U1 of the second connecting portion 54 in the Z-axis direction in the conductive member 27 (27U) provided in the battery unit 21 (21U) on the relatively positive direction side. The length U1 of the second connection portion 54 in the Z-axis direction in the conductive member 27 (27U) corresponds to a distance from an end portion of the main body portion 51 of the conductive member 27 (27U) on the negative direction side in the Z-axis direction to the protruding end portion 43 of the terminal portion 26. Thus, even when the conductive member 27 (27L) is inserted toward the terminal portion 26 of the battery unit 21 (21L) in the Z-axis direction, the flat portion 56 in the second connection portion 54 of the conductive member 27 (27L) is inhibited from coming into contact with the second connection portion 54 of the conductive member 27 (27U).

An outer shape of the unit case 23 of each battery unit 21 is formed in a box shape, for example. Two opening portions 61 penetrating the unit case 23 are formed in each unit case 23 to correspond to the two terminal portions 26. Each opening portion 61 is formed to face each terminal portion 26 in a direction in which the fastening member 41a of each terminal portion 26 advances and retreats.

Each unit case 23 includes two lid members 62 which close the two opening portions 61. The two lid members 62 are detachably attached to the unit case 23.

Figure 8:
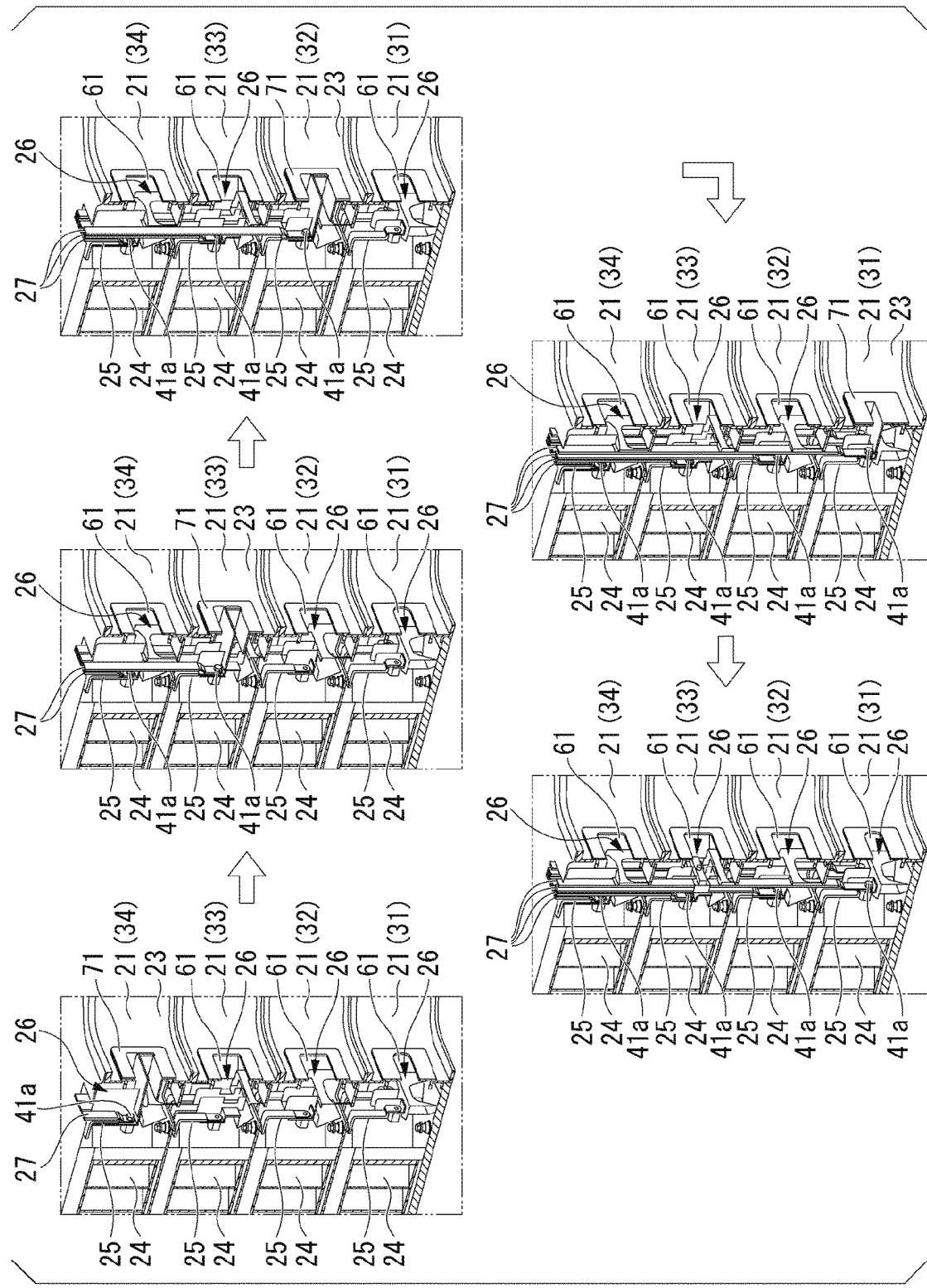
FIG. 8 is a diagram showing a method of assembling the conductive member in the power storage device according to the embodiment of the present invention, and is a perspective view showing a portion of the power storage device in a broken manner.

Hereinafter, a method of assembling the plurality of conductive members 27 in the power storage device 10 according to the embodiment will be described. FIG. 8 is a diagram showing a method of assembling the conductive members 27 in the power storage device 10 according to the embodiment, and is a perspective view showing a portion of the power storage device 10 in a broken manner.

First, in each of the plurality of battery units 21, the plurality of battery modules 22 are accommodated in the unit case 23, and the plurality of power distribution members 25 are connected to the plurality of battery modules 22.

Next, in each of the first battery unit 31, the second battery unit 32, the third battery unit 33, and the fourth battery unit 34 stacked in the Z-axis direction, the two lid members 62 are removed from the unit case 23.

Next, the plurality of conductive members 27 are inserted into the unit case 23 from the positive direction side to the negative direction side in the Z-axis direction toward the terminal portions 26 of the fourth battery unit 34. In addition, the flat portions 56 of the second connection portions 54 of the plurality of conductive members 27 and the end portions of the plurality of power distribution members 25 are fastened and fixed to the attachment seats 41 by the fastening members 41a of the respective terminal portions 26.

Further, a fastening work of the fastening member 41a is performed by an appropriate tool inserted into the opening portion 61 of the unit case 23. At the time of fastening work, a jig 71 for preventing the fastening member 41a from dropping off in the unit case 23 is mounted on an edge of the opening portion 61.

Next, sequentially in each of the third battery unit 33, the second battery unit 32, and the first battery unit 31, the plurality of conductive members 27 are inserted into the unit case 23 from the positive direction side to the negative direction side in the Z-axis direction toward the terminal portions 26. In addition, the flat portions 56 of the second connection portions 54 of the plurality of conductive members 27 and the end portions of the plurality of power distribution members 25 are fastened and fixed to the attachment seats 41 by the fastening members 41a of the respective terminal portions 26.

Further, the plurality of conductive members 27 from each battery unit 21 are connected to predetermined electronic components in the junction box 11.

As described above, while sequentially switching from each terminal portion 26 of the battery unit 21 (21U) on the positive direction side (that is, the upper layer) in the Z-axis direction to each terminal portion 26 of the battery unit 21 (21L) on the negative direction side (that is, the lower layer), the plurality of conductive members 27 are inserted into the unit case 23 in the Z-axis direction. In addition, the length L2 of the flat portion 56 in the Z-axis direction in the second connection portion 54 of the conductive member 27 for the battery unit 21 (21L) in the lower layer is formed to be longer than the length U1 of the second connection portion 54 of the conductive member 27 in the Z-axis direction for the battery unit 21 (21U) in the relatively upper layer. Thus, the second connection portion 54 of the conductive member 27 for the battery unit 21 (21L) in the lower layer is inhibited from coming into contact with the second connection portion 54 of the conductive member 27 for the battery unit 21 (21U) in the upper layer.

As described above, according to the power storage device 10 of the present embodiment, the plurality of conductive members 27 having different lengths disposed along the plurality of stacked battery units 21 are configured to overlap each other in the direction orthogonal to the Z-axis direction to be sequentially connected to the terminal portions 26 of the battery units 21 in different layers. Since the length of the second connection portion 54 of each conductive member 27 in the Z-axis direction is formed to be longer as it is formed in the battery unit 21 positioned further toward the negative direction side (that is, a layer positioned further downward) in the Z-axis direction, it is possible to securely prevent the second connection portions 54 of the conductive members 27 having different lengths from coming into contact with each other. Thus, efficiency of the electrical connection work between the plurality of conductive members 27 and the plurality of terminal portions 26 can be improved.

The positions of the attachment seats 41 of the terminal portions 26 provided in the battery units 21 in the different layers become a plurality of different positions in the direction orthogonal to the Z-axis direction, it is possible to more securely prevent the conductive members 27 having different lengths from coming into contact with each other.

Since the shapes of the second connection portions 54 of the conductive members 27 having a plurality of different lengths are bent toward the terminal portions 26 and extend in the Z-axis direction, it is possible to securely prevent the longer second connection portions 54 from coming into contact with the shorter second connection portions 54.

Since each terminal portion 26 includes the protruding end portion 43 in which the chamfered portion 43a is formed, the conductive member 27 that does not correspond to the length of the second connection portion 54 in each terminal portion 26 can be guided away from the attachment seat 41 in the direction in which the protruding end portion 43 protrudes. Thus, it is possible to more securely prevent the second connecting portions 54 of the conductive members 27 having different lengths from coming into contact with each other.

It is possible to secure the spaces required for the connection work between the terminal portions 26 and the conductive members 27 due to the opening portions 61 provided in each unit case 23.

It should be understood that the embodiments of the present invention are presented as examples and are not intended to limit the scope of the invention. These embodiments can be implemented in various other forms, and various omissions, substitutions, and modifications can be made without departing from the spirit of the invention. These embodiments and their modifications are included in the scope and gist of the invention, and are also included in the invention described in the claims and the equivalents thereof.

What is claimed is:

1. A power storage device comprising:
a plurality of power storage units which are stacked and disposed in a first direction;
a plurality of terminal portions which are provided in the plurality of power storage units; and
a plurality of conductive members which extend in the first direction along the plurality of power storage units and are connected to the plurality of terminal portions, each of the plurality of conductive members including a connection portion attached to the terminal portion, a main body portion provided integrally with the connection portion, and an electrically insulating coating covering a surface of the main body portion,
wherein, in each of the plurality of conductive members, a length of the connection portion in the first direction is set to a length according to a length of the main body portion in the first direction.

2. The power storage device according to claim 1,
wherein each of the plurality of terminal portions includes an attachment portion to which the connection portion is attached, and
a position of the attachment portion in a direction intersecting the first direction is formed to change to a position further outward from the power storage unit as the length of the main body portion in the first direction in the conductive member connected to each terminal portion increases.

3. The power storage device according to claim 1, wherein an outer shape of the connection portion is formed in a shape which is bent from the main body portion toward the terminal portion in a direction intersecting the first direction and extends in the first direction.

4. The power storage device according to claim 1,
wherein each of the plurality of terminal portions includes an attachment portion to which the connection portion is attached, and a protruding portion which protrudes from the attachment portion in a direction intersecting the first direction, and
a protruding height of the protruding portion in the intersecting direction is formed to change with a trend of increasing as the protruding portion is separated from the connection portion in the first direction.

5. The power storage device according to claim 1 further comprising:
a plurality of housings which accommodate the plurality of power storage units, and
lid members which close opening portions formed to face the plurality of terminal portions in each of the plurality of housings.

6. A power storage device comprising:
a plurality of power storage units which are stacked and disposed in a first direction;
a plurality of terminal portions which are provided in the plurality of power storage units; and
a plurality of conductive members which extend in the first direction along the plurality of power storage units and are connected to the plurality of terminal portions, each of the plurality of conductive members including a connection portion attached to the terminal portion, a main body portion provided integrally with the connection portion, and an electrically insulating coating covering a surface of the main body portion,
wherein, in each of the plurality of conductive members, a length of the connection portion in the first direction is formed to change with a trend of increasing as a length of the main body portion in the first direction increases, and
wherein each of the plurality of terminal portions includes an attachment portion to which the connection portion is attached, and
a position of the attachment portion in a direction intersecting the first direction is formed to change to a position further outward from the power storage unit as the length of the main body portion in the first direction in the conductive member connected to each terminal portion increases.

7. A power storage device comprising:
a plurality of power storage units which are stacked and disposed in a first direction;
a plurality of terminal portions which are provided in the plurality of power storage units; and
a plurality of conductive members which extend in the first direction along the plurality of power storage units and are connected to the plurality of terminal portions, each of the plurality of conductive members including a connection portion attached to the terminal portion, a main body portion provided integrally with the connection portion, and an electrically insulating coating covering a surface of the main body portion,
wherein, in each of the plurality of conductive members, a length of the connection portion in the first direction is formed to change with a trend of increasing as a length of the main body portion in the first direction increases, and
wherein each of the plurality of terminal portions includes an attachment portion to which the connection portion is attached, and a protruding portion which protrudes from the attachment portion in a direction intersecting the first direction, and
a protruding height of the protruding portion in the intersecting direction is formed to change with a trend of increasing as the protruding portion is separated from the connection portion in the first direction.

* * * * *